United States Patent [19]

Schneider

[11] 4,208,617

[45] Jun. 17, 1980

[54] LIGHT MEASURING UNIT FOR AN ELECTRONIC FLASH DEVICE

[75] Inventor: Arthur Schneider, Braunschweig-Volkenrode, Fed. Rep. of Germany

[73] Assignee: Rollei-Werke Franke & Heidecke, Brunswick, Fed. Rep. of Germany

[21] Appl. No.: 934,203

[22] Filed: Aug. 16, 1978

[30] Foreign Application Priority Data

Aug. 30, 1977 [DE] Fed. Rep. of Germany ....... 2738984

[51] Int. Cl.² ............................................. H05B 41/32
[52] U.S. Cl. .................................... 315/151; 315/159; 315/241 P; 354/33
[58] Field of Search .................... 315/151, 159, 200 R, 315/205, 241 P; 354/33, 128, 145

[56] References Cited

U.S. PATENT DOCUMENTS 3,714,443  1/1973  Ogawa ............................ 315/151 X

FOREIGN PATENT DOCUMENTS 2166613  5/1975  Fed. Rep. of Germany ....... 315/241 P

*Primary Examiner*—Eugene R. LaRoche
*Attorney, Agent, or Firm*—Schwartz, Jeffery, Schwaab, Mack, Blumenthal & Koch

[57] ABSTRACT

A light detecting and measuring device for use with an electronic flash unit comprises a phototransistor, integrating capacitor and diodes connected in circuit to the flash unit. The diodes and capacitor are connected to the phototransistor and responsive to signals from the flash unit for enabling measurement of light by the phototransistor only while the flash unit is operating thus preventing measurement from external light sources.

8 Claims, 1 Drawing Figure

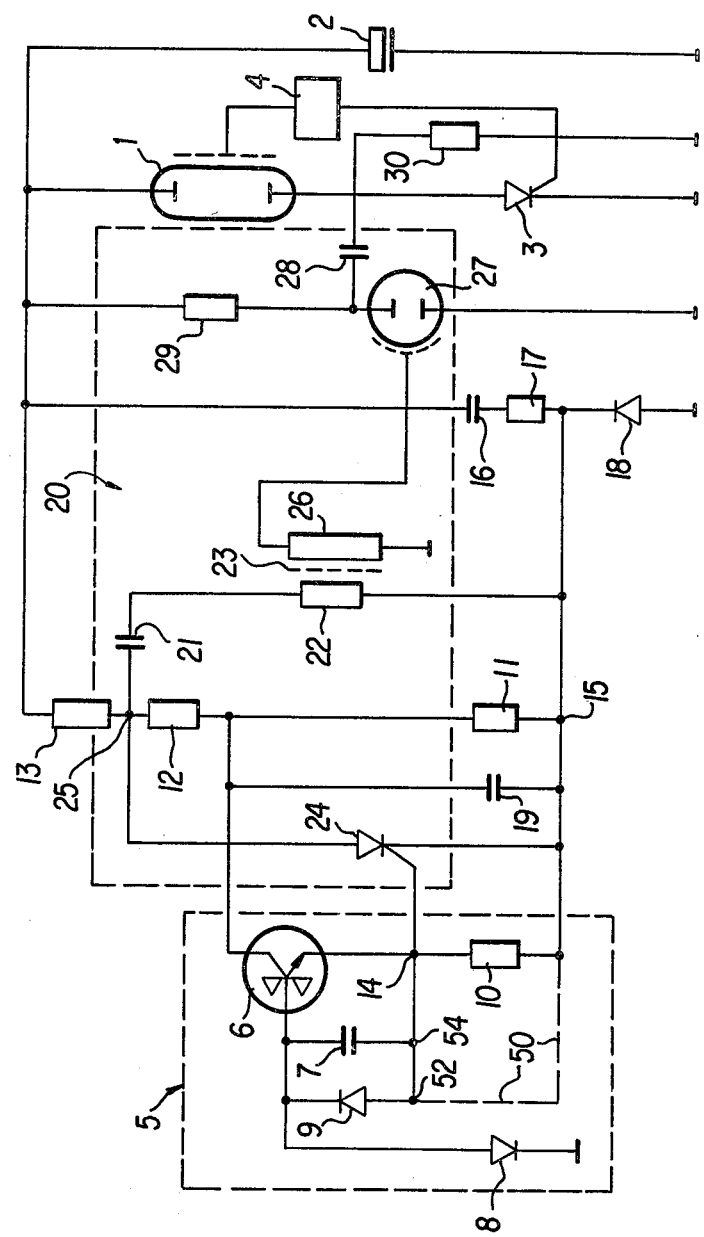

LIGHT MEASURING UNIT FOR AN ELECTRONIC FLASH DEVICE

BACKGROUND OF THE INVENTION

The invention relates to an electronic flash device for the purposes of photographic exposure. It includes a flash tube and a storage capacitor dischargeable through the flash tube, a light measuring unit to detect the amount of light reflected by the object of the exposure to produce a signal upon measuring a predetermined amount of light, a flash limiting unit to discontinue the emission of light by the flash tube upon receiving the signal of the light measuring unit and a device to block external flashes. The blocking device blocks the light measuring unit and permits light measurement only during the emission of light by the flash tube. The light measuring unit comprises a photodetector which may comprise a phototransistor. An integrating capacitor is connected in parallel to the base-emitter region of the phototransistor and the signal for the flash limiting unit is taken off a resistor connected to the emitter of the phototransistor.

In a known electronic flash device of this type, such as described in German Offlegungsschrift DT-OS 24 35 235 incorporated herein by reference, the base of the phototransistor is connected with zero potential by means of an NPN transistor. The base of the transistor is connected permanently to a positive potential through a resistor so that the transistor is constantly conducting and the integrating capacitor is discharged. At the onset of the emission of light by the flash tube, a negative pulse is applied to the base of the transistor through an additional resistor, which causes the base to block the transistor, i.e. renders it non-conducting. As a result, the integrating capacitor is charged until the base-emitter region of the phototransistor becomes conductive. Because of the current amplification by the phototransistor, the emitter current rises sharply and a signal for the flash limiting unit may be taken from the emitter.

Thus, while the transistor is conducting, any current generated by the incidence of light upon the phototransistor in the collector-base region of said phototransistor is conducted off through the collector-emitter region of the conducting transistor, thereby preventing an increase in the potential on the integrating capacitor which would otherwise possibly lead to a full switching of the phototransistor and the production of a signal at the emitter. The transistor thus constitutes the external flash blocking means, which allows the charging of the integrating capacitor only during the emission of light by the flash tube by applying a negative pulse to the base of the transistor during the emission of light by the flash tube, said negative pulse causing the blocking of the transistor.

An external flash as utilized herein means simply any light received by the measuring unit which is not generated originally by the electronic flash device. To insure the accurate operation of this external flash blocking means and to prevent it from causing a false effect on the results of measurements by the light measuring unit, the control current which maintains the transistor in a permanently conducting state, i.e. the base current of the transistor, must be as intense as possible, because the collector current of the transistor increases with the intensity of the base current. If during the blocking phase of the external flash blocking means, a strong flash of light is incident upon the phototransistor, then, in order to prevent the charging of the integrating capacitor, the entire base-collector current of the phototransistor must be conducted over the transistor. This, however, is possible only if the transistor is controlled at a saturation level by means of a high control current. A partial charge on the capacitor even if very slight, due to a low level of the control of the transistor, would, in the case of a flash exposure released immediately following the external flash, cause a false result of the measurement by the light measuring unit. The light measuring unit would thus be induced to release a premature signal to the flash limiting unit, causing the latter to terminate the emission of light by the flash tube prematurely. The result would be underexposure of the photographic image.

Because the transistor must be nearly always in a conducting state and is blocked for a short period of time only during the emission of light by the flash tube, such a high intensity control current for the transistor represents an additional load on the battery or charging device. Because the control current for the transistor is usually supplied by the storage capacitor of the flash unit, this procedure results in an additional discharge of the storage capacitor of the flash unit. This is particularly the case where so-called RE circuits are used in flash devices. In such devices, in order to obtain short flash sequences by means of a switching thyristor arranged in series with the flash tube which is blocked by the flash limiting unit to terminate the emission of the flash, only sufficient energy is taken from the storage capacitor to obtain the exact exposure of the photographic image. This additional constant consumption of current by the transistor leads to a reduction of the charge storage available for the flash tube, in turn resulting in longer flash sequence times since, with an identical light volume being emitted by the flash tube, the storage capacitor must be recharged more frequently.

SUMMARY OF THE INVENTION

It is the object of the invention to provide an electronic flash device of the type described hereinabove, having a light measuring unit which, while avoiding the disadvantages of known light measuring units, is of a simple design and is capable of being assembled from inexpensive structural elements.

This object is attained in accordance with the present invention by the fact that the base of the phototransistor is connected to a first diode at ground potential, that a second diode is connected by its cathode with the base and with its anode with the emitter contacts with its other terminal a positive potential through a second resistor and that during the duration of the light emission by the flash tube a negative pulse is applied to the point of juncture between the first and the second resistors.

In accordance with the principles of the invention a light detecting device is provided from an electronic flash unit. The flash unit has a light flash generating device such as a flash tube and supplies a first voltage signal when the flash generating device is operating and a second voltage signal when the flash generating device is not operating. The light detecting devices comprises a phototransistor having a collector, base and emitter, the phototransistor connected in circuit with the flash unit. Further, the light detecting device comprises a capacitor means for integrating the electrical signal and diode means connected in circuit with the flash unit, phototransistor and integrating capacitor means and responsive to the first and second voltage signals. The diode means enables the emitter-collector region of the phototransistor to conduct current thus charging the integrating capacitor in response to the first voltage signal but inhibiting emitter-collector conduction and charging of the integrating capacitor in response to the second voltage signal. As a consequence, the detecting device is responsive to incident light for charging the integrating capacitor means when the flash generating device is operating but is otherwise not responsive to light for charging the integrating capacitor means.

BRIEF DESCRIPTION OF THE DRAWING

These and other objects of the invention will become clear in reference to the detailed description which follows taken in conjunction with the single FIGURE which shows a schematic diagram of the invention.

DETAILED DESCRIPTION OF THE PREFERRED EMBODIMENT

In the case of an activated flash device, these measures insure that prior to the ignition of the flash tube at the plate of the integrating capacitor connected to the emitter of the phototransistor, there is always a higher forward voltage present at the second diode than is present at the plate of the integrating capacitor connected to the base of the phototransistor. The voltage at the base of the phototransistor is in turn always higher than the ground potential by a voltage corresponding to the forward voltage of the first diode. As long as the flash tube remains untriggered, the phototransistor is securely blocked by these means. Any base-collector current induced by external light incident upon the phototransistor will be drained off by the first diode and cannot charge the integrating capacitor. Only the application of a negative pulse to the juncture between the first and second resistors will block the first and second diodes which subsequently begins the measurement of the light reflected by the object of the exposure by means of the integration of the base-collector current in the integrating capacitor.

These features of the invention thus provide a securely functioning external light blocking means or device requiring no control current while the flash device is activated and therefore using no energy in the flash device.

In one embodiment of the invention, a positive potential is derived from the storage capacitor, the second resistor being connected to the positive plate of said storage capacitor through third and fourth resistors, and the collector of the phototransistor is connected to the juncture of the second and fourth resistors. In this manner, the supply of current both for the positive potential necessary for the generation of the blocking voltage at the phototransistor and for the phototransistor itself, may be assured in an especially simple mode.

A preferred mode of embodiment of the invention includes a series circuit comprising a first capacitor, a fifth resistor and a third diode connected on its cathode side to the fifth resistor in parallel with the storage capacitor, the juncture between the first and the second resistor is connected with the cathode of the third diode and the storage capacitor is charged prior to the ignition of the flash tube. The negative voltage pulse required for the release of the external light blocking device during the emission of light by the flash tube may be produced in a particularly simple manner by this circuitry, because, when the flash tube is conducting, the storage capacitor discharges through the flash tube, the third diode and the fifth resistor. There exists therefore a potential at the cathode of the third diode during the discharge of said capacitor, which is lower by the forward voltage of the third diode than the ground potential and which therefore is negative.

The embodiment of the present invention teaches that the flash limiting unit comprises in a known manner a series circuit with a pulse capacitor, a winding of a pulse transformer and a first thyristor so that the gate of the thyristor is connected with the emitter of the phototransistor, the cathode of the thyristor with the cathode of the third diode and the anode of the thyristor with a voltage divider tap between the third and fourth resistors. In this manner, the flash limiting unit, which is known in itself, may be connected advantageously with the light measuring unit of the present invention.

The invention will be described hereafter with reference to the circuit diagram shown in the drawing.

The electronic flash device comprises a flash tube 1 and a storage capacitor 2 connected in series with said flash tube and dischargeable through the flash tube 1. An electronic switch in the form of a second thyristor 3 is arranged in series with the flash tube 1 and the storage capacitor 2, said switch serving to terminate the emission of light by the flash tube. An ignition device 4, which sends a pulse to the control electrodes of the flash tube 1 and the gate of thyristor 3 in order to trigger the flash, is activated synchronously with the camera release during a photographic exposure. The light measuring unit 5, provided to detect the amount of light reflected by the object of the exposure and to produce a signal upon measuring a predetermined value of the amount of light, comprises as its light detector a phototransistor 6 and an integrating capacitor 7, connected in parallel with the emitter and base of the phototransistor 6. The base of the phototransistor 6 is connected through a first diode 8 to ground. A second diode 9 is connected in parallel with the integrating capacitor 7, so that the anode of said diode 9 is connected with the emitter of the phototransistor 6. A first resistor 10 has one side thereof connected with the emitter of the phototransistor 6, the other side of said resistor 10 being connected to a positive potential through a second resistor 11. This positive potential is derived from the storage capacitor 2 by means of connecting the second resistor 11 through third and fourth resistors 13 and 12 respectively with the positive plate of the storage capacitor 2. The collector of the phototransistor is connected between the second resistor 11 and the fourth resistor 12, in order to supply current to said phototransistor. The signal produced by the light measuring unit 5 upon measuring a predetermined value of the amount of light may be taken-off at the emitter, specifically at juncture 14.

An external flash blocking means which blocks the light measuring unit 5 and releases it only during the emission of light by the flash tube 1, is obtained by the arrangement in a circuit as shown of the first diode 8 and the second diode 9, together with the first resistor 10, the second resistor 11 and the connection of the second resistor through the third and fourth resistors 13 and 12 to the positive plate of the storage capacitor 2. The external flash blocking means is released by a negative pulse applied to the juncture 15 between the first and second resistors 10 and 11 during the emission of light by the flash tube. In order to produce said pulse, a series circuit comprising a first capacitor 16, a fifth resistor 17 and a third diode 18, is connected parallel to the series circuit comprising the flash tube 1 and the second thyristor 3, and to the storage capacitor 2. The third diode is connected on its cathode side to the fifth resistor 17. The juncture 15 between the first and second resistors 10 and 11 is also connected to the cathode of the third diode 18. When the flash device is in the state of readiness, i.e. with the device activated but the flash tube 1 not yet ignited, the capacitor 16 is charged.

The flash limiting unit 20 comprises in a known manner a series circuit consisting of a pulse capacitor 21, a first winding 22 of a pulse transformer 23 and a first thyristor 24. The gate of the thyristor 24 is connected to receive the signal taken-off of point 14 of the light measuring unit 5, i.e. at the emitter of the phototransistor 6, while the cathode of the thyristor 24 is connected with the juncture 15 between the first and second resistors 10 and 11. To charge the pulse capacitor 21, the connecting line between the anode of the thyristor 24 and the capacitor 21 is connected to a voltage divider tap 25 between the third and fourth resistors 13 and 12. A second winding 26 of the pulse transformer 23 is connected to the control electrode of a switching valve 27. This switching valve 27 is part of a quenching circuit, of known type, for the second thyristor 3, in series with the switching valve 27. To charge the quenching capacitor 28, a sixth resistor 29 is connected on one side with the positive plate of the storage capacitor 2 and on the other, with the juncture between the switching valve 27 and the quenching capacitor 28 and further a seventh resistor 30 is arranged parallel to the thyristor 3.

The operation of the present invention described hereinabove is as follows: Upon the activation of the flash device, the storage capacitor 2 is charged (by a battery or charging device, not shown) to its operating potential of approximately 360 V. The quenching capacitor 28, the capacitor 16 and the pulse capacitor 21, are charged simultaneously. Current flows from the storage capacitor 2 through the resistors 13, 12, 11 and 10 and the diodes 9 and 8 to ground. Because of the very small resistance of the first resistor 10, the voltage on the gate of the thyristor 24 is somewhat lower than at the cathode of said thyristor. The thyristor 24 is thus securely blocked. By reason of the forward voltage bias of diode 9, the emitter of the phototransistor 6 has a higher potential than its base. The base of phototransistor 6, in turn has a higher potential than ground due to the forward voltage of the first diode 8. The integrating capacitor 7 is thus negatively pre-loaded by the forward voltage of the second diode 9. As pointed out hereinabove, the emitter-base of the phototransistor 6 is non-conducting, even when external light strikes the phototransistor 6 thus generating a flow of a current in the collector-base.

In order to release a flash, the ignition device 4 must be activated, which then releases a simultaneous impulse to the control electrode of the flash tube 1 and the gate of thyristor 3, so that both become conducting. The storage capacitor 2 then may be discharged through the flash tube 1 and the conducting thyristor 3 and as the result, the flash tube 1 emits a flash of light. Simultaneously with the conductance of the flash tube 1 and the thyristor 3, the capacitor 16 discharges through the flash tube 1, the thyristor 3, the third diode 18 and the resistor 17. This discharge current produces at the cathode of the third diode 18 a potential which is lower than the zero or ground potential because of the forward potential of the diode 18. Because of the negative potential at the cathode of the diode 18, the diodes 8 and 9 are blocked. The light emitted by the flash tube 1 and reflected by the object of the exposure now strikes the phototransistor 6 and produces in the phototransistor a collector-base current which is integrated in the integrating capacitor 7. When the charging potential of the integrating capacitor 7 attains the threshold value at which the emitter-base of the phototransistor becomes a conductor, then, due to the amplifying effect of the phototransistor 6, a current flows in the collector-emitter of the phototransistor 6, causing a drop in voltage at the first resistor 10, sufficient to trigger the thyristor 24.

With the triggering of the thyristor, the pulse capacitor 21 is discharged instantaneously through the winding 22 of the pulse transformer 23. The current pulse induced in the secondary winding 26 of the pulse transformer 23 triggers the switching valve 27 so that the quenching capacitor 28 is discharged through the anode-cathode path of the thyristor 3, thus blocking the thyristor. The blocking of the thyristor 3 interrupts the flash discharge of the storage capacitor 2 and the emission of a flash by the flash tube is terminated.

The capacitor designated in the circuit diagram by 19, inserted between the collector of the phototransistor 6 and the connection 15 between the first and the second resistors 10 and 11, serves to smooth the supply voltage for the phototransistor 6. In order to keep the flow of current from the storage capacitor 2 through the resistors 13, 12, 11 and 10 and the diodes 9 and 8 as low as possible, the sum of the resistance values of the resistors 11, 12 and 13 are chosen to reflect high resistivities. The resistance value of the first resistor 10, on the other hand, is very low.

The invention is not restricted to a so-called RE circuit of a flash device, such as shown in the drawing, in which the flash is interrupted by means of a thyristor inserted in the charging circuit of a storage capacitor 2 and a flash tube 1, but is equally applicable to flash devices in which the emission of light is discontinued by means of shorting a flash tube. It is also possible to use a Zener diode in place of the third diode 18. Further, the connection of the anode of the diode 9 not directly to the emitter of the phototransistor 6, but with the terminal of the first resistor 10, which is not connected with the emitter, i.e. with the juncture 15 between the first and second resistors 10 and 11, does not signify a changing or departure of the invention. Such an arrangement is illustrated in the figure by the connection of line 50 (shown as a dotted line) and removal of the line between points 52 and 54. Because the current flowing through the resistors 10, 11, 12 and 13 and the diodes 8 and 9 is small, the drop in voltage at the low resistivity resistor 10 is negligibly small.

What is claimed is:

1. A light detecting device for an electronic flash unit, said flash unit having a light flash generating device and supplying a first voltage signal when said flash generating device is operating and a second voltage signal when said flash generating device is not operating said detecting device responsive to incident light when said flash generating device is operating and otherwise not responsive to incident light, said light detecting device comprising:

(a) a phototransistor having a collector, base and emitter, said phototransistor connected in circuit with said flash unit;

(b) capacitor means charged by collector-base current of said phototransistor when said detecting device is responsive to incident light;

(c) diode means connected in circuit with said flash unit, said phototransistor and said capacitor means and responsive to said first and second voltage signals, said diode means enabling charging of said capacitor means in response to said first voltage signal and inhibiting charging of said capacitor means in response to said second voltage signal;

(d) said phototransistor generating collector-emitter current in response to charging of said capacitor means to a predetermined value for terminating operation of said flash generating device;

(e) said diode means comprises:
  (i) a first diode having an anode connected to the base of said phototransistor and a cathode connected to ground potential and;
  (ii) a second diode having a cathode connected to the base of the phototransistor and having an anode;

(f) resistor means connected at one terminal to said emitter of said phototransistor and at the other terminal to receive said first and second voltage signals, said first voltage signal being a negative voltage signal and said second voltage signal being a positive voltage signal; and (g) said anode of said second diode connected to said resistor means.

2. A light detecting device as recited in claim 1 wherein said anode of said second diode is connected to said one terminal of said resistor means.

3. A light detecting device as recited in claim 1 wherein said anode of said second diode is connected to the other terminal of said resistor means.

4. A light detecting device as recited in claim 1 wherein said capacitor means is connected across the emitter and base of said phototransistor.

5. A light detecting device as recited in claim 1 wherein said flash unit has a storage capacitor and said second voltage signal is supplied by said storage capacitor.

6. A light detecting device as recited in claim 5 wherein said flash unit has voltage dividing resistors connected to said storage capacitor for supplying said second voltage signal and the collector of said phototransistor is connected to said voltage dividing resistors.

7. A light detecting device as recited in claim 5 or 6 wherein said flash unit further comprises a series circuit comprising a diode, resistor and capacitor, said series circuit connected in parallel across said storage capacitor, said other terminal of said resistor means of said light detecting device connected between said diode and said resistor of said series circuit.

8. A light detecting device as recited in claim 7 wherein said flash unit further comprises a thyristor having a gate connected to the emitter of said phototransistor, said thyristor connected in circuit with said flash generating device for rendering same inoperative.

* * * * *